(12) United States Patent
An (10) Patent No.: US 8,844,285 B2
(45) Date of Patent: Sep. 30, 2014

(54) TWO-STAGE SUPERCHARGING EXHAUST TURBOCHARGER

(75) Inventor: Byeongil An, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 922 days.

(21) Appl. No.: 12/524,394

(22) PCT Filed: Oct. 3, 2008

(86) PCT No.: PCT/JP2008/068409
§ 371 (c)(1),
(2), (4) Date: Sep. 9, 2009

(87) PCT Pub. No.: WO2009/048116
PCT Pub. Date: Apr. 16, 2009

(65) Prior Publication Data
US 2010/0095672 A1    Apr. 22, 2010

(30) Foreign Application Priority Data

Oct. 12, 2007   (JP) .................................. 2007-266027

(51) Int. Cl.
*F02B 33/44* (2006.01)
*F02C 6/12* (2006.01)
(Continued)

(52) U.S. Cl.
CPC ............. *F02B 37/013* (2013.01); *Y02T 10/144* (2013.01); *Y02T 50/671* (2013.01); *F02C 6/12* (2013.01); *F05D 2270/58* (2013.01); *F01D 17/105* (2013.01); *F01D 25/24* (2013.01); *F01N 13/10* (2013.01); *F05D 2230/21* (2013.01); *F02B 37/183* (2013.01); *F02B 37/02* (2013.01); *F02B 37/004* (2013.01)
USPC .......................................... 60/605.2; 60/612

(58) Field of Classification Search
USPC .................. 60/612, 605.2; 123/562
See application file for complete search history.

(56) References Cited

U.S. PATENT DOCUMENTS 3,576,102 A * 4/1971 West ............................... 60/602
4,294,073 A   10/1981 Neff
(Continued)

FOREIGN PATENT DOCUMENTS

EP   1 136 676 A2   9/2001
EP   1 536 141 A1   6/2005
(Continued)

OTHER PUBLICATIONS

European Search Report mailed Jan. 11, 2013 issued in corresponding European Patent Application No. 08837611.6.
(Continued)

*Primary Examiner* — Kenneth Bomberg
*Assistant Examiner* — Mary A Davis
(74) *Attorney, Agent, or Firm* — Birch Stewart Kolasch & Birch, LLP (57) ABSTRACT

A two-stage supercharging exhaust turbocharger includes: a high-pressure-stage supercharger having a high-pressure turbine driven by exhaust gas discharged from an exhaust manifold of an engine; a low-pressure-stage supercharger having a low-pressure turbine driven by the exhaust gas used to drive the high-pressure-stage supercharger, the high-pressure-stage supercharger and the low-pressure-stage supercharger being arranged in series in an exhaust gas passageway; and an exhaust gas control valve configured to selectively change flow rates of the exhaust gas passageways of the high-pressure-stage supercharger and the low-pressure-stage supercharger, wherein an exhaust manifold incorporating casing is configured by integrally forming the exhaust manifold, a high-pressure turbine housing of the high-pressure-stage supercharger, and a valve casing accommodating the exhaust gas control valve.

5 Claims, 6 Drawing Sheets

(51) Int. Cl.
*F02B 37/013* (2006.01)
*F01D 17/10* (2006.01)
*F01D 25/24* (2006.01)
*F01N 13/10* (2010.01)
*F02B 37/18* (2006.01)
*F02B 37/02* (2006.01)
*F02B 37/00* (2006.01)

(56) References Cited

U.S. PATENT DOCUMENTS

| | | | |
|---|---|---|---|
| 4,930,315 A * | 6/1990 | Kanesaka | 60/600 |
| 5,020,327 A * | 6/1991 | Tashima et al. | 60/600 |
| 6,079,211 A * | 6/2000 | Woollenweber et al. | 60/612 |
| 6,802,184 B2 * | 10/2004 | Huter et al. | 60/612 |
| 7,302,800 B2 * | 12/2007 | Klingel | 60/612 |
| 7,600,380 B2 * | 10/2009 | Grissom et al. | 60/612 |
| 8,028,525 B2 * | 10/2011 | An et al. | 60/612 |
| 8,087,243 B2 * | 1/2012 | Schmitz | 60/598 |
| 2003/0159442 A1 * | 8/2003 | Huter et al. | 60/612 |
| 2004/0083730 A1 | 5/2004 | Wizgall et al. | |
| 2005/0144946 A1 | 7/2005 | Claus | |
| 2006/0254273 A1 * | 11/2006 | Grissom et al. | 60/602 |
| 2007/0062188 A1 * | 3/2007 | Fry et al. | 60/599 |
| 2007/0074513 A1 * | 4/2007 | Lamb et al. | 60/612 |
| 2007/0169479 A1 * | 7/2007 | Nicolle et al. | 60/612 |
| 2009/0265080 A1 * | 10/2009 | Fry et al. | 701/103 |
| 2011/0185724 A1 * | 8/2011 | Barth et al. | 60/599 |

FOREIGN PATENT DOCUMENTS

| | | | |
|---|---|---|---|
| EP | 1 626 169 A1 | | 2/2006 |
| EP | 2050939 A1 | * | 4/2009 |
| EP | 2050940 A1 | * | 4/2009 |
| JP | 2-56820 U | | 4/1990 |
| JP | 2-64725 U | | 5/1990 |
| JP | 5-508462 A | | 11/1993 |
| JP | 6-48119 Y2 | | 12/1994 |
| JP | 2003-221639 A | | 8/2003 |
| WO | WO-91/18190 A1 | | 11/1991 |
| WO | 2006/121745 A1 | | 11/2006 |

OTHER PUBLICATIONS

Chinese Notice of Allowance issued in Chinese Application No. 200880003872.6 on Jan. 15, 2013.

Korean Notice of Allowance issued in Korean Application No. 10-2009-7016583 on Aug. 27, 2012.

European Office Action, dated Jun. 25, 2014, for European Application No. 08 837 611.6.

* cited by examiner

TWO-STAGE SUPERCHARGING EXHAUST TURBOCHARGER

BACKGROUND OF THE INVENTION

1. Field of the Invention

The present invention relates to a two-stage supercharging exhaust turbocharger including a high-pressure-stage supercharger driven by exhaust gas discharged from an exhaust manifold of an engine; a low-pressure-stage supercharger driven by the exhaust gas used to drive the high-pressure-stage supercharger, the high-pressure-stage supercharger and the low-pressure-stage supercharger being arranged in series in an exhaust gas passageway; and an exhaust gas control valve configured to selectively change flow rates of the exhaust gas passageways of the high-pressure-stage supercharger and the low-pressure-stage supercharger.

2. Description of the Related Art

In recent years, a vehicle diesel engine adopts a two-stage supercharging exhaust turbocharger which includes a high-pressure-stage supercharger having a high-pressure turbine driven by exhaust gas discharged from an engine and a low-pressure-stage supercharger having a low-pressure turbine driven by the exhaust gas used to drive the high-pressure-stage supercharger, wherein the high-pressure-stage supercharger and the low-pressure-stage supercharger are arranged in series in an exhaust gas passageway, and wherein air subjected to a first-stage pressurizing operation of the low-pressure compressor of the low-pressure-stage supercharger is subjected to a second-stage pressurizing operation of the high-pressure compressor of the high-pressure-stage supercharger and is supplied to an engine.

In the engine provided with the multi-stage supercharging exhaust turbocharger, a two-stage supercharging operation using both the high-pressure-stage supercharger and the low-pressure-stage supercharger is carried out in a low-speed running region, which is advantageous in a transient characteristic and an increase of low-speed torque of the engine. Additionally, a one-stage supercharging operation using the low-pressure-stage supercharger is carried out in a high-speed running region of the engine by allowing the exhaust gas to bypass the high-pressure-stage supercharger. In this manner, it is possible to further improve efficiency of the compressor and thus to realize a reliable running state having an excellent degree of freedom in matching.

Figure 6:
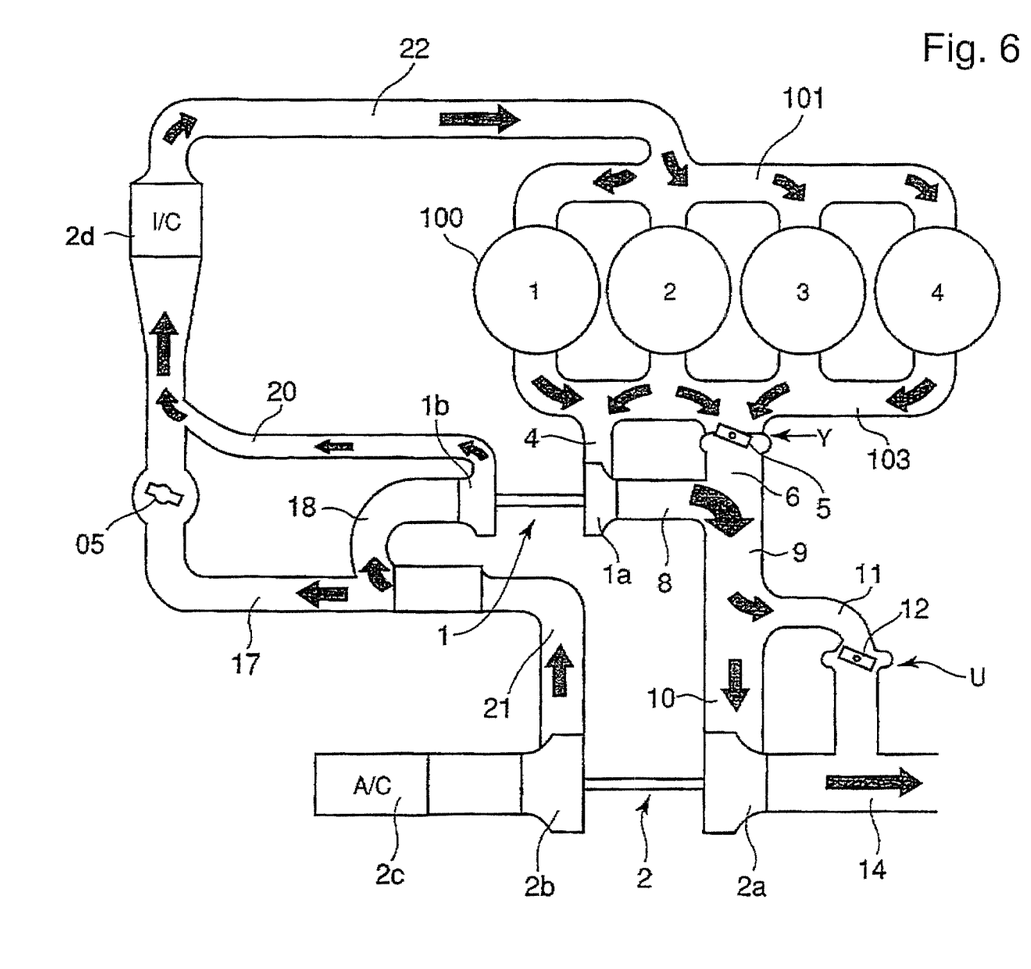
FIG. 6 is an explanatory view showing an operation of the two-stage supercharging exhaust turbocharger.

FIG. 6 is an explanatory view showing an operation of the two-stage supercharging exhaust turbocharger.

In FIG. 6, Reference Numeral 1 denotes a high-pressure-stage supercharger, where the high-pressure-stage supercharger 1 includes a high-pressure turbine 1a and a high-pressure compressor 1b coaxially driven by the high-pressure turbine 1a. Reference Numeral 2 denotes a low-pressure-stage supercharger, where the low-pressure-stage supercharger 2 includes a low-pressure turbine 2a and a low-pressure compressor 2b coaxially driven by the low-pressure turbine 2a.

The exhaust gas discharged from a cylinder 100 of the engine is collected in an exhaust manifold 103 and is supplied to the high-pressure turbine 1a of the high-pressure-stage supercharger 1 via an exhaust pipe 4. A part of the exhaust gas is supplied to the low-pressure turbine 2a of the low-pressure-stage supercharger 2 via an exhaust gas control valve 5, an exhaust pipe 6, and an exhaust pipe 10.

Here, the exhaust gas control valve 5 shown in a Y part of FIG. 6 is provided between the high-pressure-stage supercharger 1 and the low-pressure-stage supercharger 2, and is used to control a relationship between an amount of the exhaust gas of the high-pressure-stage supercharger 1 and an amount of the exhaust gas bypassing the high-pressure-stage supercharger 1 and supplied to the low-pressure turbine 2a of the low-pressure-stage supercharger 2 by controlling an opening degree thereof. That is, the exhaust gas passing through the high-pressure turbine 1a of the high-pressure-stage supercharger 1 and an exhaust pipe 8 and the exhaust gas of which a flow rate is controlled by the exhaust gas control valve 5 are mixed at an exhaust pipe 9 and the mixed gas is supplied to the low-pressure turbine 2a of the low-pressure-stage supercharger 2 via an exhaust pipe 10.

In the low-pressure-stage supercharger 2, the low-pressure compressor 2b is coaxially driven by the low-pressure turbine 2a so as to pressurize air supplied from an air cooler 2c, and the pressurized air is supplied to the high-pressure compressor 1b of the high-pressure-stage supercharger 1 via an air supply pipe 21 and an air supply suction pipe 18.

In the high-pressure-stage supercharger 1, the high-pressure compressor 1b is coaxially driven by the high-pressure turbine 1a so as to supply the pressurized air to a cylinder 100 of an engine via an air supply pipe 20, an intercooler 2d, an air supply pipe 22, and an exhaust manifold 101.

Here, a compressor bypass valve unit 05 is provided in a bypass pipe 17 of the high-pressure compressor 1b so as to control an amount of air bypassing the high-pressure compressor 1b.

Additionally, a waste gate valve 12 is provided in a bypass pipe 11 of the low-pressure turbine 2a so as to control an amount of exhaust gas bypassing the low-pressure turbine 2a.

Figure 4:
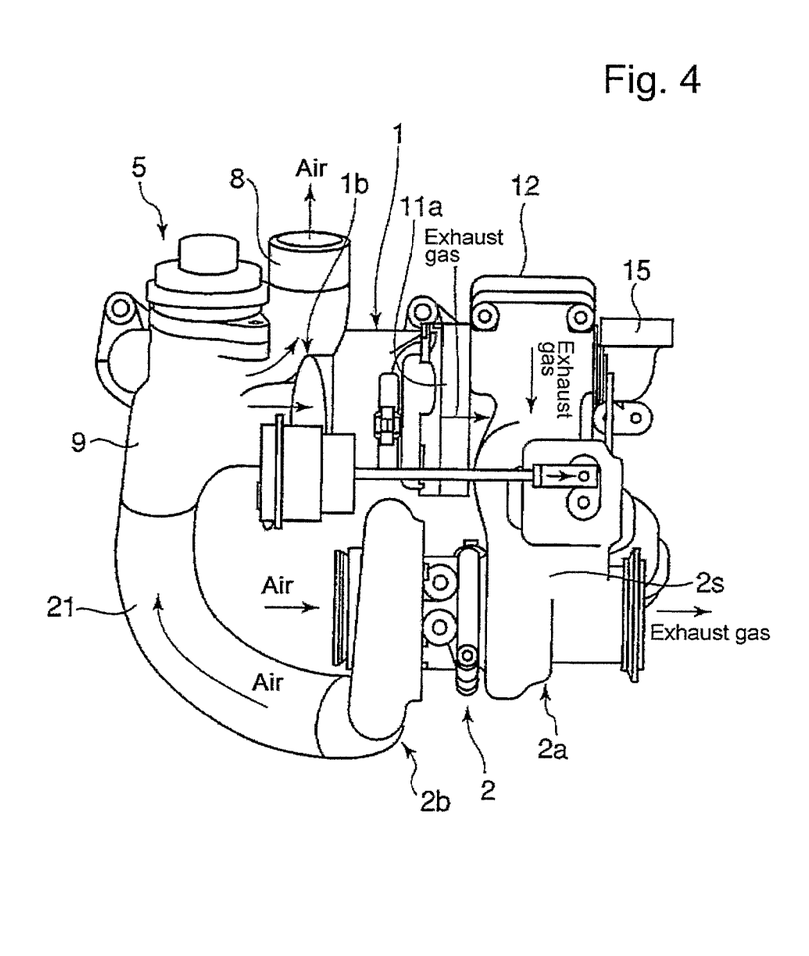
FIG. 4 is an explanatory view showing a structure of a main part of the two-stage supercharging exhaust turbocharger.

FIG. 4 is an explanatory view showing a structure of a main part of the two-stage supercharging exhaust turbocharger.

In FIG. 4, Reference Numeral 1 denotes a high-pressure-stage supercharger, where the high-pressure-stage supercharger 1 includes a high-pressure turbine 1a and a high-pressure compressor 1b coaxially driven by the high-pressure turbine 1a. Reference Numeral 2 denotes a low-pressure-stage supercharger, where the low-pressure-stage supercharger 2 includes a low-pressure turbine 2a and a low-pressure compressor 2b coaxially driven by the low-pressure turbine 2a.

An outlet of the high-pressure turbine 1a (not shown in FIG. 4) is connected to a low-pressure connection casing 12 at a connection surface 11a by the use of bolts so as to be connected to a low-pressure gas inlet passageway 2s of the low-pressure-stage supercharger 2 via the low-pressure connection casing 12.

The compressed air discharged from the low-pressure compressor 2b of the low-pressure-stage supercharger 2 is sucked into the high-pressure compressor 1b of the high-pressure-stage supercharger 1 via an air supply connection pipe 21 and a high-pressure compressor cover 9. Here, as described above, a compressor bypass valve unit 05 is provided in a bypass pipe 17 of the high-pressure compressor 1b so as to control an amount of air bypassing the high-pressure compressor 1b and discharged from an air discharge pipe 18.

Figure 5A:
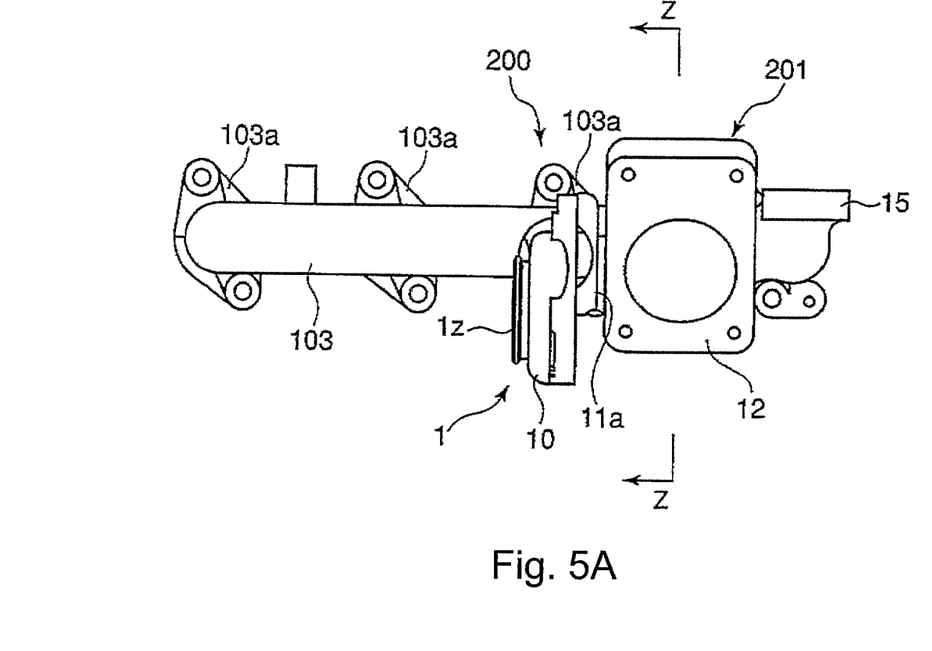
FIG. 5A is a view showing a structure of a low-pressure connection portion and an exhaust manifold portion of the two-stage supercharging exhaust turbocharger shown in FIG. 4.
Figure 5B:
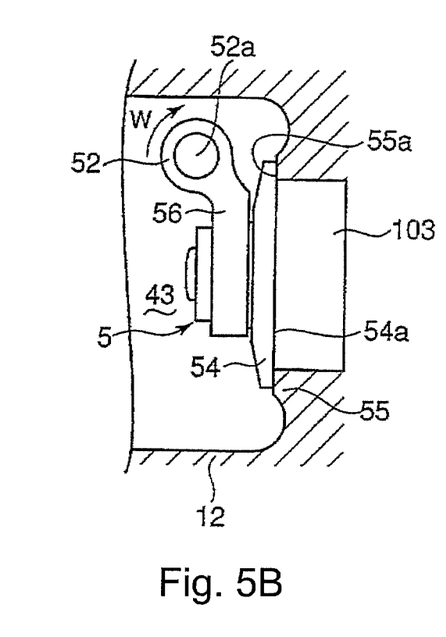
FIG. 5B is a sectional view taken along the line Z-Z shown in FIG. 5A.

FIG. 5A is a view showing a structure of a low-pressure connection portion and an exhaust manifold portion of the two-stage supercharging exhaust turbocharger shown in FIG. 4, and FIG. 5B is a sectional view taken along the line Z-Z shown in FIG. 5A.

In FIG. 5, Reference Numeral 200 denotes an exhaust manifold portion, where the exhaust manifold 103 is integrally formed with a housing 10 of the high-pressure turbine 1a of the high-pressure-stage supercharger 1 by casting.

Reference Numeral 103a denotes an exhaust gas inlet flange of each cylinder (not shown) of the engine. As shown in FIG. 5, a right angle is formed between a flange surface of the exhaust gas inlet flange 103a and a flange surface 1z of the high-pressure housing 10, and the flange surface is coupled to an exhaust gas outlet flange (not shown) of each cylinder by the use of a plurality of bolts.

As shown in FIG. 5B, Reference Numeral 201 denotes a low-pressure connection portion. The low-pressure connection casing 12 is provided with the exhaust gas control valve 5 and is integrally formed with an EGR pipe 15.

The exhaust gas control valve 5 provided between the high-pressure-stage supercharger 1 and the low-pressure-stage supercharger 2 controls an opening degree thereof so as to control a relationship between an amount of the exhaust gas of the high-pressure-stage supercharger 1 and an amount of the exhaust gas bypassing the high-pressure-stage supercharger 1 and supplied to the low-pressure turbine 2a of the low-pressure-stage supercharger 2.

That is, in FIG. 5B, the exhaust gas control valve 5 includes a valve member 54 and a valve seat 55 on which the valve member 54 is seated, where one end of the valve member 54 is supported to a rotary shaft 52 so as to be rotatable about a shaft center 52a of the rotary shaft 52 in a direction indicated by the arrow W in terms of a support arm 56.

The lower surface 54a of the valve member 54 is formed into a plane. When the valve member 54 is swung about the shaft center 52a of the rotary shaft 52, a lower surface 54a of the valve member 54 comes into contact with a seat surface 55a of the valve seat 55 to thereby close the valve member 54.

Upon opening the valve member 54, the rotary shaft 52 is rotated in a direction indicated by the arrow W of FIG. 5 by the use of an exhaust gas control valve driving unit (not shown) to thereby open the valve member 54 in terms of the support arm 56.

Then, the exhaust manifold portion 200 with the above-described configuration and the low-pressure connection portion 201 equipped with the exhaust gas control valve 5 are connected to each other at the connection surface 11a by the use of a plurality of bolts.

Additionally, Patent Document 1 (Japanese Utility Model Application Laid-Open No. H06-48119) discloses a two-stage exhaust turbocharger in which a high-pressure-stage supercharger and a low-pressure-stage supercharger are connected to each other in terms of a low-pressure connection pipe, an exhaust gas control valve is provided in an inlet of the low-pressure-stage supercharger, and then a part of exhaust gas in the inlet of the low-pressure-stage supercharger is returned to an exhaust manifold.

In order to install an engine equipped with the two-stage supercharging exhaust turbocharger in a narrow engine room of a vehicle engine, an installation space in the engine room increases inevitably since the two-stage supercharging exhaust turbocharger is larger than a single-stage supercharging exhaust turbocharger.

For this reason, it is required to efficiently install the engine equipped with the two-stage supercharging exhaust turbocharger in the narrow engine room by realizing a compact in size of the structure of the two-stage supercharging exhaust turbocharger to decrease the installation space thereof as small as possible.

In the exhaust manifold portion 200 according to the convention art shown in FIG. 5, the exhaust manifold 103 is integrally formed with the housing 10 of the high-pressure turbine 1a of the high-pressure-stage supercharger 1 by casting. In the low-pressure connection portion 201, the low-pressure connection casing 12 is provided with the exhaust gas control valve 5 and is integrally formed with the EGR pipe 15. The exhaust manifold portion 200 and the low-pressure connection portion 201 are connected to each other at the connection surface 11a by the use of the plurality of bolts.

For this reason, since it is necessary to provide two components, that is, the exhaust manifold portion 200 and the low-pressure connection portion 201, the number of components increases and the number of assembling processes using a bolt increases. Also, it is necessary to carry out many processes upon separating the exhaust manifold portion 200 and the low-pressure connection portion 201 in the narrow engine room.

Additionally, as described above, since it is necessary to provide two components, that is, the exhaust manifold portion 200 and the low-pressure connection portion 201, the weight of the assembling components increases.

SUMMARY OF THE INVENTION

The present invention is contrived in consideration of the above-described problems, and an object of the invention is to provide a light and compact two-stage supercharging exhaust turbocharger capable of reducing the weight and the number of components, of reducing the number of assembling processes using a bolt, and of reducing the number of separating processes in a narrow engine room in such a manner that an exhaust manifold portion, in which an exhaust manifold and a high-pressure turbine housing of a high-pressure-stage supercharger are integrally formed with each other by casting, is integrally formed with a low-pressure-stage connection portion mounted with an exhaust gas control valve.

In order to achieve the above-described object, according to an aspect of the invention, there is provided a two-stage supercharging exhaust turbocharger including: a high-pressure-stage supercharger having a high-pressure turbine driven by exhaust gas discharged from an exhaust manifold of an engine; a low-pressure-stage supercharger having a low-pressure turbine driven by the exhaust gas used to drive the high-pressure-stage supercharger, the high-pressure-stage supercharger and the low-pressure-stage supercharger being arranged in series in an exhaust gas passageway; and an exhaust gas control valve configured to selectively change flow rates of the exhaust gas passageways of the high-pressure-stage supercharger and the low-pressure-stage supercharger, wherein an exhaust manifold incorporating casing is configured by integrally forming the exhaust manifold, a high-pressure turbine housing of the high-pressure-stage supercharger having a rotary center disposed in parallel to a center of the exhaust manifold, and a valve casing accommodating the exhaust gas control valve and disposed perpendicular to the exhaust manifold and the high-pressure turbine housing.

The two-stage supercharging exhaust turbocharger may have the following configuration.

(1) The valve casing may include an exhaust gas passageway opened or closed by the exhaust gas control valve and disposed on the side of the exhaust manifold and an exhaust gas passageway disposed on the side of a low-pressure turbine inlet of the low-pressure-stage supercharger.

(2) The exhaust manifold incorporating casing may be formed into a single body by casting.

(3) A low-pressure inlet casing of the low-pressure-stage supercharger may be directly connected to a lower portion of the exhaust manifold incorporating casing.

The conventional art has a configuration in which the exhaust manifold portion and the low-pressure connection portion are formed into separate members and are connected to each other at a connection surface. However, according to the embodiment, since the two-stage supercharging exhaust turbocharger has a configuration in which the exhaust manifold incorporating casing is configured by integrally forming the exhaust manifold, the high-pressure turbine housing of the high-pressure-stage supercharger disposed in parallel to the center of the exhaust manifold, and the valve casing accommodating the exhaust gas control valve and disposed in a direction perpendicular to the exhaust manifold and the high-pressure turbine housing, it is possible to form the exhaust manifold incorporating casing having a single body structure by casting.

Accordingly, since the exhaust manifold incorporating casing is configured by forming the functional components into a single body by casting, it is possible to reduce the number of components from two to one, and to reduce the weight.

Additionally, it is possible to omit the assembling process in which two components are connected to each other by the use of bolts, and it is not necessary to carry out many processes upon separating the low-pressure connection portion and the exhaust manifold portion from each other in a narrow engine room. Accordingly, it is possible to obtain the two-stage supercharging exhaust turbocharger which is light and compact by reducing the number of components.

Furthermore, it is possible to directly connect the low-pressure inlet casing of the common low-pressure-stage supercharger to the lower portion of the exhaust manifold incorporating casing in an easy manner.

DESCRIPTION OF THE PREFERRED EMBODIMENTS

Hereinafter, exemplary embodiments of the invention will be described in detail with reference to the accompanying drawings. Here, although the dimension, the material, the shape, the relative arrangement, and the like of the component are described in the embodiment, the scope of the invention is not limited thereto so long as a particular description is not made, but those are only examples for a description.

Figure 1:
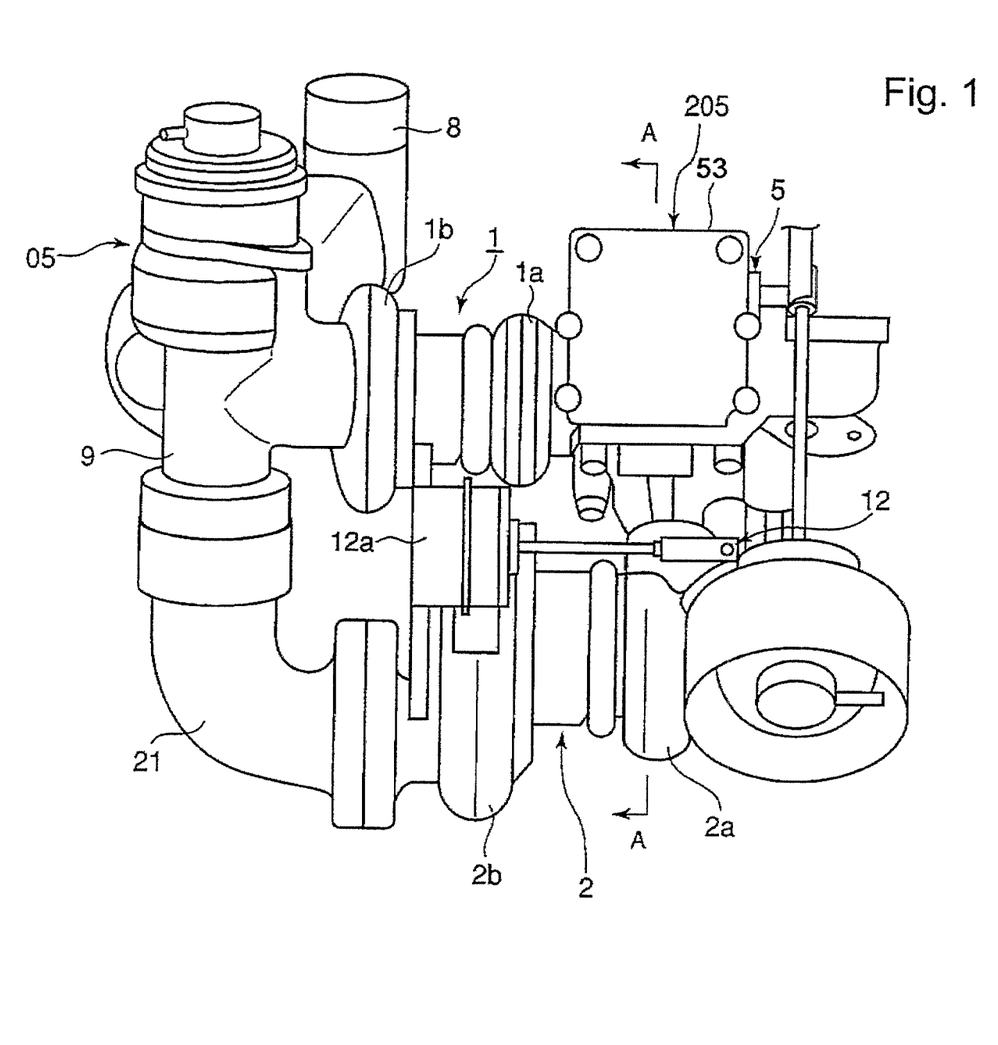
FIG. 1 is a side view showing a two-stage supercharging exhaust turbocharger according to an embodiment of the invention.
Figure 2:
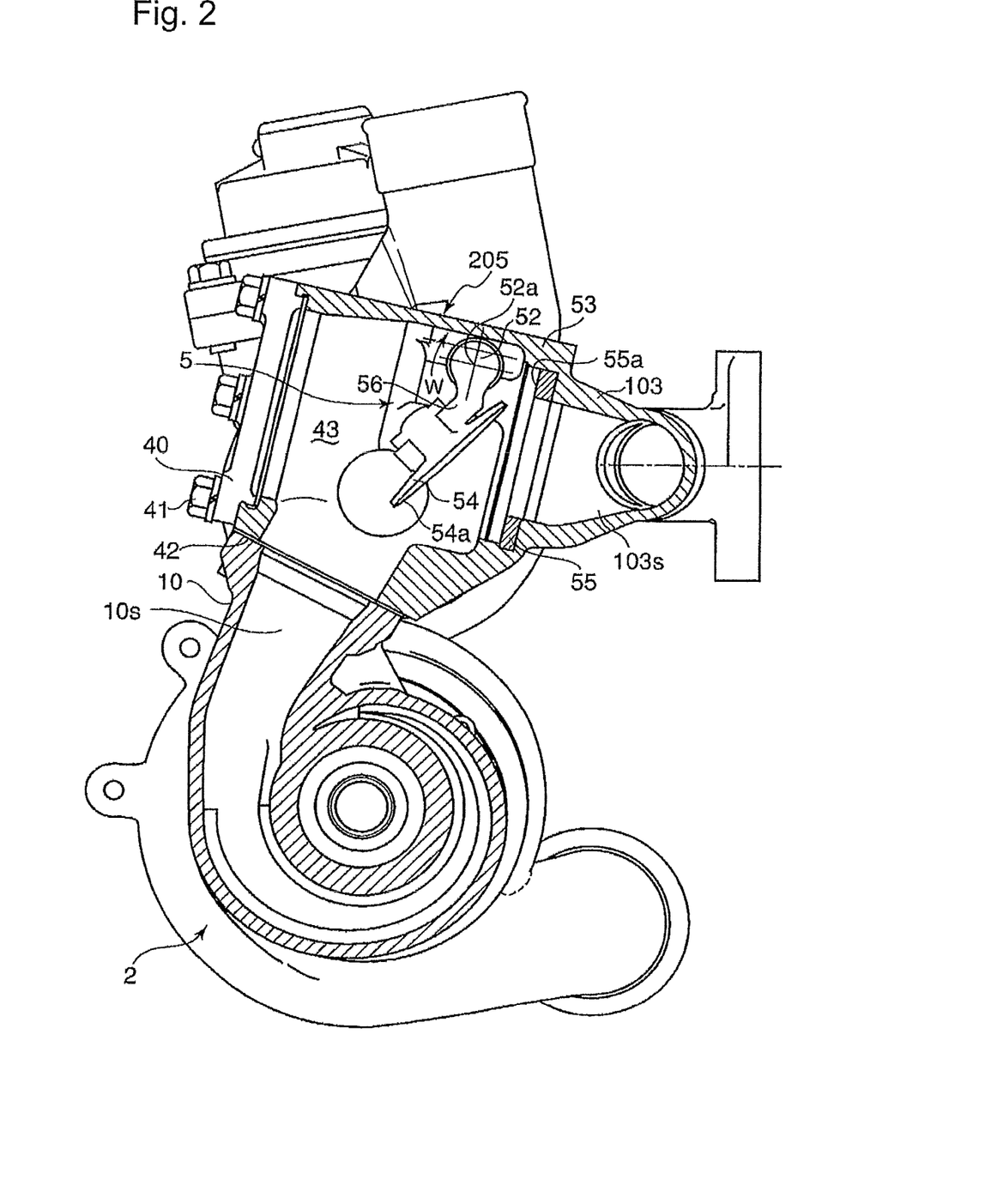
FIG. 2 is a sectional view taken along the line A-A shown in FIG. 1.
Figure 3:
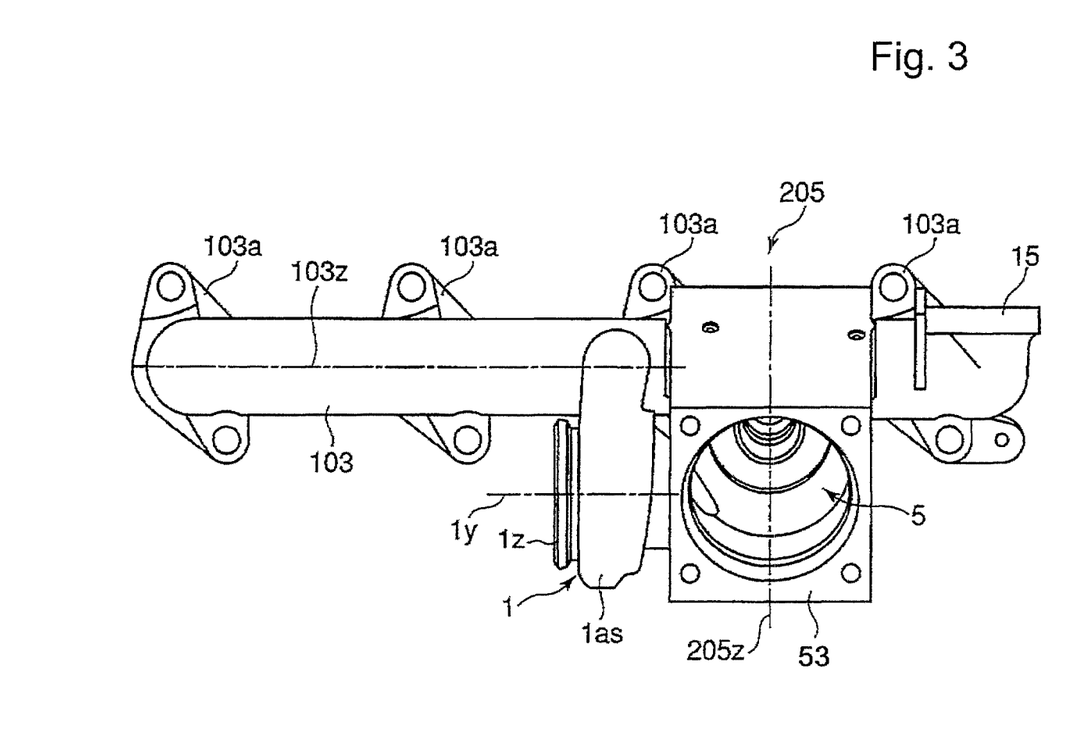
FIG. 3 is a side view showing an exhaust manifold incorporating casing according to the embodiment.

FIG. 1 is a side view showing a two-stage supercharging exhaust turbocharger according to an embodiment of the invention. FIG. 2 is a sectional view taken along the line A-A shown in FIG. 1. FIG. 3 is a side view showing an exhaust manifold incorporating casing according to the embodiment.

In FIG. 1, Reference Numeral 1 denotes a high-pressure-stage supercharger, where the high-pressure-stage supercharger 1 includes a high-pressure turbine 1a and a high-pressure compressor 1b coaxially driven by the high-pressure turbine 1a. Reference Numeral 2 denotes a low-pressure-stage supercharger, where the low-pressure-stage supercharger 2 includes a low-pressure turbine 2a and a low-pressure compressor 2b coaxially driven by the low-pressure turbine 2a.

In FIG. 2, Reference Numeral 205 denotes an exhaust manifold incorporating casing, where the exhaust manifold incorporating casing 205 is connected to a low-pressure inlet casing 10 and the low-pressure inlet casing 10 is connected to the low-pressure turbine 2a of the low-pressure-stage supercharger 2.

Then, compressed air discharged from the low-pressure compressor 2b of the low-pressure-stage supercharger 2 is sucked into the high-pressure compressor 1b of the high-pressure-stage supercharger 1 via an air supply connection pipe 21 and a high-pressure compressor cover 9.

Here, as described above, a compressor bypass valve unit 05 is provided in a bypass pipe 17 of the high-pressure compressor 1b so as to control an amount of air bypassing the high-pressure compressor 1b and discharged from an air discharge pipe 8.

Next, an attachment portion between an exhaust gas control valve and the exhaust manifold incorporating casing 205 is described in detail in FIG. 2. In FIG. 2, the exhaust manifold incorporating casing 205 includes a valve casing 53.

One-side exhaust gas discharged from a cylinder of an engine is collected into an exhaust manifold 103 (see FIG. 3) and is supplied to the high-pressure-stage supercharger 1. Also, the other-side exhaust gas is supplied to the low-pressure-stage supercharger 2 via an exhaust gas control valve 5 and the low-pressure inlet casing 10.

The low-pressure inlet casing 10 is fixed to an attachment surface 42 of the valve casing 53 by the use of a bolt. Additionally, Reference Numeral 40 denotes a cover of a valve chamber 43 formed in the valve casing 53, the cover being fixed by the use of a plurality of bolts 41.

In the same manner as the conventional art, the exhaust gas control valve 5 is provided with a valve seat 55 fixed to the valve casing 53. The exhaust gas control valve 5 includes a valve member 54 and the valve seat 55 on which the valve member 54 is seated, where one end of the valve member 54 is supported to a rotary shaft 52 so as to be rotatable about a shaft center 52a of the rotary shaft 52 in a direction indicated by the arrow W in terms of a support arm 56.

An outer-peripheral lower surface 54a of the valve member 54 is formed into a plane. When the valve member 54 is swung about the shaft center 52a of the rotary shaft 52, the outer-peripheral lower surface 54a of the valve member 54 comes into contact with a seat surface 55a of the valve seat 55 to thereby close the valve member 54.

Upon opening the valve member 54, the rotary shaft 52 is rotated in a direction indicated by the arrow W of FIG. 5 by the use of an exhaust gas control valve driving unit (not shown) to thereby open the valve member 54 via the support arm 56.

The exhaust gas control valve 5 has the above-described configuration, and is used to control a relationship between an amount of the exhaust gas of the high-pressure-stage supercharger 1 and an amount of the exhaust gas supplied to the low-pressure turbine 2a of the low-pressure-stage supercharger 2 after bypassing the high-pressure-stage supercharger 1 by controlling an opening degree thereof.

FIG. 3 is a side view showing the exhaust manifold incorporating casing 205 according to the embodiment of the invention.

In FIG. 3, Reference Numeral 205 denotes the exhaust manifold incorporating casing. A plurality of exhaust gas inlet flanges 103a is provided and the exhaust manifold 103 is disposed so as to dispose a center 103z in an axial direction of the engine. A high-pressure turbine housing 1as of the high-pressure-stage supercharger 1 is disposed so as to make a rotary center 1y be in parallel to the center 103z. The valve casing 53 which accommodates the exhaust gas control valve 5 and of which the lower portion is directly connected to the low-pressure inlet casing 10 is disposed so that the center 205z of the exhaust gas control valve 5 is perpendicular to the exhaust manifold and the high-pressure turbine housing.

Then, the exhaust manifold incorporating casing 205 is formed into a single body by casting.

As shown in FIG. 3, a right angle is formed between a flange surface of each the exhaust gas inlet flange 103a of the cylinder of the engine and a flange surface 1z of the high-pressure housing 1as, and the exhaust gas inlet flange 103a is coupled to an exhaust gas outlet flange (not shown) of each cylinder by the use of a plurality of bolts. The valve casing 53 is integrally formed with an EGR pipe 15.

As shown in FIG. 2, the valve casing 53 includes an exhaust gas passageway 103s disposed on the side of the exhaust manifold 103 and opened or closed by the exhaust gas control valve 5 and an exhaust gas passageway 10s formed in the low-pressure inlet casing 10 of the low-pressure-stage supercharger 2. The low-pressure inlet casing 10 of the low-pressure-stage supercharger 2 is directly connected to the lower portion of the exhaust manifold incorporating casing 205, that is, the attachment surface 42 provided in the valve casing 53.

The conventional art has a configuration in which the exhaust manifold portion and the low-pressure connection portion are formed into separate members and are connected to each other at a connection surface. However, according to the embodiment, since the exhaust manifold incorporating casing 205 is configured by integrally forming the exhaust manifold 103, the high-pressure turbine housing 1as of the high-pressure-stage supercharger 1 disposed in parallel to the center 103z of the exhaust manifold 103, and the valve casing 53 accommodating the exhaust gas control valve 5 and disposed in a direction perpendicular to the exhaust manifold 103 and the high-pressure turbine housing 1as, it is possible to form the exhaust manifold incorporating casing 205 having a single body structure by casting.

According to the exhaust manifold incorporating casing 205 according to the embodiment, it is possible to reduce the number of components from two to one, and to reduce the weight by integrally forming the casing.

Further, it is possible to omit the assembling process in which two components are connected to each other by the use of bolts, and it is not necessary to carry out many processes upon separating the low-pressure connection portion and the exhaust manifold portion from each other in a narrow engine room. Accordingly, it is possible to obtain the two-stage supercharging exhaust turbocharger which is light and compact by reducing the number of components.

Furthermore, it is possible to directly connect the low-pressure inlet casing 10 of the common low-pressure-stage supercharger 2 to the lower portion of the exhaust manifold incorporating casing 205 in an easy manner.

Industrial Applicability

According to the invention, since the exhaust manifold portion, in which the exhaust manifold and the high-pressure turbine housing of the high-pressure-stage supercharger are integrally formed with each other by casting, is integrally formed with the low-pressure connection portion mounted with the exhaust gas control valve, it is possible to provide the light and compact two-stage supercharging exhaust turbocharger capable of reducing the weight and the number of components, of reducing the number of assembling processes using a bolt, and of reducing the number of separating processes in the narrow engine room.

The invention claimed is:

1. A two-stage supercharging exhaust turbocharger comprising:
    a high-pressure-stage supercharger having a high-pressure turbine driven by exhaust gas discharged from an exhaust manifold of an engine;
    a low-pressure-stage supercharger having a low-pressure turbine driven by the exhaust gas used to drive the high-pressure-stage supercharger, the high-pressure-stage supercharger and the low-pressure-stage supercharger being arranged in series in an exhaust gas passageway; and
    an exhaust gas control valve configured to selectively change flow rates of the exhaust gas passageways of the high-pressure-stage supercharger and the low-pressure-stage supercharger,
    wherein an exhaust manifold incorporating casing is configured by integrally forming the exhaust manifold, a high-pressure turbine housing of the high-pressure-stage supercharger having a rotary center line extending in parallel to a center line of the exhaust manifold, and a valve casing, accommodating the exhaust gas control valve, is disposed such that a center line of the exhaust gas control valve crosses the center line of the exhaust manifold and the rotary center line of the high-pressure turbine housing,
    the exhaust manifold incorporating casing comprises a single cast body structure and is provided with a plurality of exhaust inlet flanges of respective cylinders of the engine, wherein a flange surface of each exhaust inlet flange is a surface at right angle to a flange surface of the high-pressure housing, and
    the valve casing is provided with an attachment surface facing downward, and the low-pressure -stage supercharger is mounted on the attachment surface at a position lower than the valve casing, and the valve casing has a first port and a second port for discharging the exhaust gas to an outside of the valve casing, and the first port discharges the exhaust gas to the low-pressure turbine.

2. The two-stage supercharging exhaust turbocharger according to claim 1, wherein the valve casing includes an exhaust gas passageway opened or closed by the exhaust gas control valve and disposed on the side of the exhaust manifold and an exhaust gas passageway disposed on the side of a low-pressure turbine inlet of the low-pressure-stage supercharger.

3. The two-stage supercharging exhaust turbocharger according to claim 1, wherein a low-pressure inlet casing of the low-pressure-stage supercharger is directly connected to a lower portion of the exhaust manifold incorporating casing.

4. The two-stage supercharging exhaust turbocharger according to claim 1, wherein the second port discharged the exhaust gas to an EGR pipe.

5. The two-stage supercharging exhaust turbocharger according to claim 1, wherein the valve casing forming the exhaust gas manifold incorporating casing is disposed in an exhaust gas discharge side of the high-pressure turbine housing, and along the center line of the exhaust manifold and alongside the high-pressure turbine housing in a horizontal direction.

* * * * *